United States Patent
Seo et al.

(10) Patent No.: US 10,001,748 B2
(45) Date of Patent: Jun. 19, 2018

(54) HOLOGRAPHY REPRODUCING APPARATUS AND HOLOGRAPHY REPRODUCING METHOD

(71) Applicant: SAMSUNG ELECTRONICS CO., LTD., Suwon-si (KR)

(72) Inventors: Wontaek Seo, Suwon-si (KR); Sunil Kim, Suwon-si (KR); Hongseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/697,166

(22) Filed: Apr. 27, 2015

(65) Prior Publication Data

US 2016/0033935 A1 Feb. 4, 2016

(30) Foreign Application Priority Data

Jul. 29, 2014 (KR) .................. 10-2014-0096772

(51) Int. Cl.
*G03H 1/22* (2006.01)
*G03H 1/02* (2006.01)

(52) U.S. Cl.
CPC ......... *G03H 1/2294* (2013.01); *G03H 1/2202* (2013.01); *G03H 1/2286* (2013.01); *G03H 2001/0212* (2013.01); *G03H 2001/0224* (2013.01); *G03H 2001/2236* (2013.01); *G03H 2001/2239* (2013.01); *G03H 2001/2242* (2013.01); *G03H 2222/50* (2013.01); *G03H 2225/10* (2013.01)

(58) Field of Classification Search
CPC ...... G03H 1/22; G03H 1/2205; G03H 1/2202; G02B 5/32; G02B 27/22; G02F 1/133611

USPC ............. 359/15, 32, 11, 8; 348/40; 349/122
See application file for complete search history.

(56) References Cited

U.S. PATENT DOCUMENTS

| | | | |
|---|---|---|---|
| 7,636,184 B2 | 12/2009 | Schwerdtner | |
| 7,826,006 B2 * | 11/2010 | Koganezawa | .... G02F 1/133611 349/56 |
| 7,847,912 B2 * | 12/2010 | Nishizawa | ........ G02F 1/133305 349/158 |
| 8,120,828 B2 | 2/2012 | Schwerdtner | |
| 8,488,246 B2 | 7/2013 | Border et al. | |
| 8,493,535 B2 * | 7/2013 | Enomoto | .......... G02F 1/133536 349/122 |
| 8,817,068 B2 * | 8/2014 | Yoon | ...................... G02B 27/22 348/40 |
| 9,501,036 B2 * | 11/2016 | Kang | ................... G03H 1/2294 |
| 2007/0103776 A1 * | 5/2007 | Cok | ...................... G03B 21/56 359/451 |
| 2014/0036329 A1 | 2/2014 | Kang et al. | |

FOREIGN PATENT DOCUMENTS

KR 10-1208832 B1 12/2012
KR 10-1345140 B1 12/2013

\* cited by examiner

*Primary Examiner* — Audrey Y Chang
(74) *Attorney, Agent, or Firm* — Sughrue Mion, PLLC

(57) ABSTRACT

A holography reproducing apparatus and a holography reproducing method are provided. The holography reproducing apparatus includes: a backlight configured to emit light, and a spatial light modulator configured to modulate light input from the backlight and transmit the modulated light to generate a transmissive hologram image, wherein at least one of a wave front of light emitted from the backlight and the spatial light modulator has a curved surface.

18 Claims, 4 Drawing Sheets

HOLOGRAPHY REPRODUCING APPARATUS AND HOLOGRAPHY REPRODUCING METHOD

CROSS-REFERENCE TO RELATED APPLICATION(S)

This application claims the benefit of Korean Patent Application No. 10-2014-0096772, filed on Jul. 29, 2014, in the Korean Intellectual Property Office, the disclosure of which is incorporated herein in its entirety by reference.

BACKGROUND

1. Field

Apparatuses and methods consistent with exemplary embodiments relate to holography reproducing apparatuses and holography reproducing methods.

2. Description of Related Art

Various holography reproducing methods may be used to generate a hologram. For example, a holography reproducing method using a panel is widely used. In this method, Fresnel transformation is used to generate the hologram.

However, because a large amount of calculation is required when performing Fresnel transformation in the reproducing methods and apparatuses of the related art, it is difficult to generate and display images in real time. Therefore, in order to reproduce holography to display hologram images in real time, a holography reproducing apparatus that is capable of reducing the amount of calculation required when performing Fresnel transformation for holography reproduction is needed.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide holography reproducing apparatuses and holography reproducing methods, which are capable of reducing the amount of calculation when performing Fresnel transformation for holography reproduction.

Additional aspects will be set forth in part in the description which follows and, in part, will be apparent from the description, or may be learned by practice of the exemplary embodiments.

According to an aspect of an exemplary embodiment, there is provided a holography reproducing apparatus including: a backlight configured to emit light; and a spatial light modulator configured to modulate light input from the backlight and transmit the modulated light to generate a transmissive hologram image, wherein at least one of a wave front of light emitted from the backlight and the spatial light modulator has a curved surface.

The spatial light modulator may have a curved surface.

The curved surface of the spatial light modulator may have locally the same radius of curvature as a distance between the spatial light modulator and a coordinate plane just in front of an eye lens.

The curved surface of the spatial light modulator may be a concave curved surface.

The curved surface of the spatial light modulator may have a shape selected from a paraboloid, a hyperboloid, an ellipsoid, a parabola, a hyperbola, and an elliptic line.

The backlight may be further configured to emit non-plane wave light of which a wave front has a curved surface locally the same radius of curvature as a distance between the wave front and a coordinate plane just in front of an eye lens.

The backlight may be further configured to emit non-plane wave light having a wave front that has a shape selected from a paraboloid, a hyperboloid, an ellipsoid, a parabola, a hyperbola, and an elliptic line.

The backlight may emit non-plane wave light of which a wave front has a concave curved surface.

The backlight may be further configured to emit coherent light.

The wave front of the non-plane wave light emitted from the backlight and the spatial light modulator may have a curved surface.

The wave front of the non-plane wave light emitted from the backlight and the curved surface of the spatial light modulator each may have a shape selected from a paraboloid, a hyperboloid, an ellipsoid, a parabola, a hyperbola, and an elliptic line.

The curved surface of the wave front of the non-plane wave light emitted from the backlight and the curved surface of the spatial light modulator may be a concave curved surfaces.

According to an aspect of another exemplary embodiment, there is provided a holography reproducing method including: generating computer generated hologram (CGH) data for reproducing a desired hologram image when at least one of a wave front of light emitted from a backlight and a spatial light modulator that modulates light input from the backlight and transmits the modulated light to generate a transmissive hologram image has a curved surface; and reproducing the transmissive hologram image by modulating light incident on the spatial light modulator, based on the generated CGH data.

The generating of the CGH data may include generating a signal for controlling the spatial light modulator to reproduce a desired hologram image when the spatial light modulator has a curved surface.

The generating of the CGH data may include generating a signal for controlling the spatial light modulator to reproduce a desired hologram image when the curved surface of the spatial light modulator has locally the same radius of curvature as a distance between the spatial light modulator and a coordinate plane just in front of an eye lens.

The generating of the CGH data may include generating a signal for controlling the spatial light modulator to reproduce a desired hologram image when the curved surface of the spatial light modulator is concave curved surfaces.

The generating of the CGH data may include generating a signal for controlling the spatial light modulator to reproduce a desired hologram image when the curved surface of the spatial light modulator has a shape selected from a paraboloid, a hyperboloid, an ellipsoid, a parabola, a hyperbola, and an elliptic line.

According to an aspect of another exemplary embodiment, there is provided a holographic display apparatus including: a backlight configured to emit coherent light; a controller configured to generate data to reproduce a desired hologram image; and a curved spatial light modulator configured to modulate the coherent light and transmit the modulated light to render the desired hologram image, based on the generated data.

The curved spatial light modulator may have locally the same radius of curvature as a distance between the spatial light modulator and a coordinate plane just in front of an eye lens.

According to the holography reproducing apparatus and the holography reproducing method according to an aspect of an exemplary embodiment, the amount of calculation required for hologram generation may be reduced by using a spatial light modulator having a concave-curved surface locally with the same radius of curvature as a distance between the spatial light modulator and a coordinate plane just in front of an eye lens. In addition, a field lens may be not required for hologram generation, and thus, the configuration of an optical system may be simplified.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
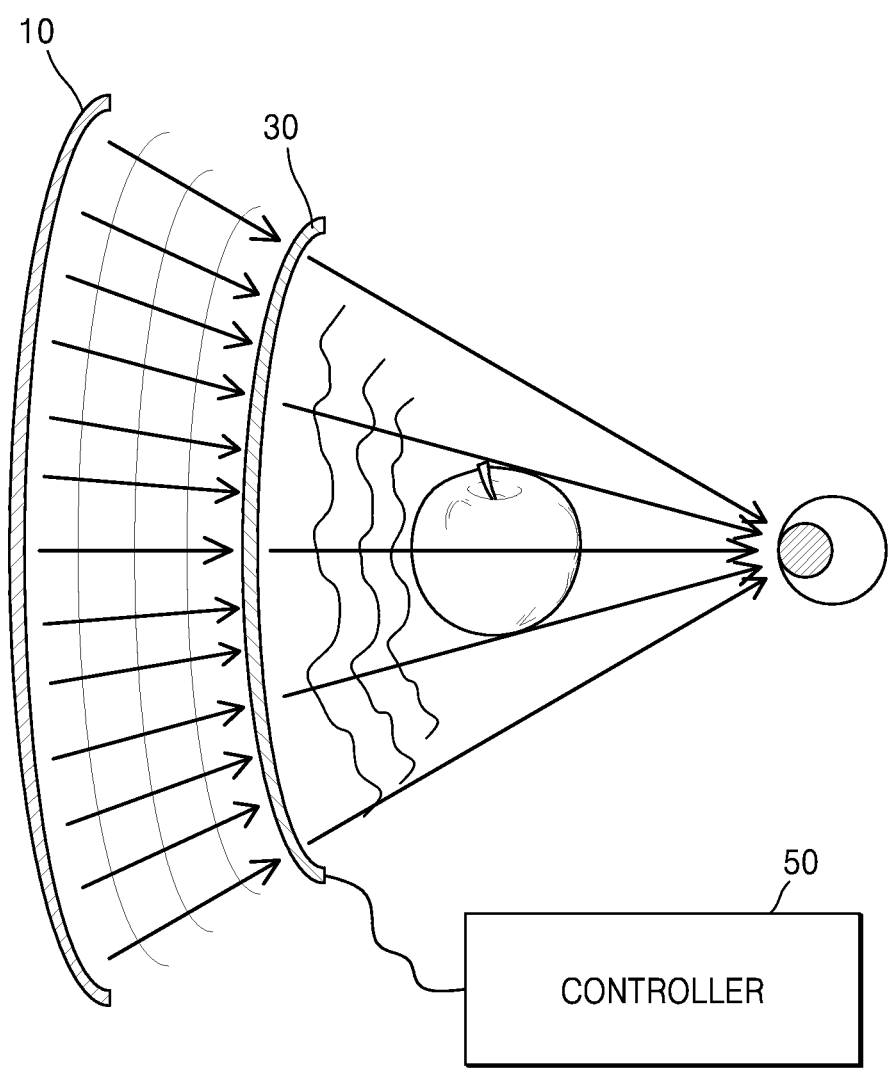
FIG. 1 is a schematic diagram illustrating a holography reproducing apparatus according to an exemplary embodiment.

Certain exemplary embodiments will now be described in greater detail with reference to the accompanying drawings. In the following description, like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. Also, well-known functions or constructions are not described in detail since they would obscure the application with unnecessary detail. As used herein, the term "and/or" includes any and all combinations of one or more of the associated listed items.

FIG. 1 is a schematic diagram illustrating a holography reproducing apparatus according to an exemplary embodiment.

Referring to FIG. 1, the holography reproducing apparatus includes a backlight unit 10 that emits light, a spatial light modulator 30 that modulates light input from the backlight unit 10 and transmits the modulated light to generate a hologram image, and a controller 50 that sends a control signal to the spatial light modulator 30 to generate the hologram image based on computer generated hologram (CGH) data calculated to reproduce the desired hologram image.

The controller may include at least one of a processor, such as a central processing unit (PCU), a microprocessor, a hardware module, a circuit, or the like, that performs the described various operations.

The backlight unit 10, which has a light source that provides light to the spatial light modulator 30 to generate the hologram image, may emit coherent light that may at least locally interfere so that a hologram image may be generated by the spatial light modulator 30. For example, the backlight unit 10 may include a general laser light source or a semiconductor laser. Alternatively, the backlight unit 10 may include a coherent light-emitting device (LED).

The backlight unit may be formed to emit plane wave light having a plane wave front or non-plane wave light having a curved wave front. For example, the backlight unit 10 may be formed to emit plane wave light having a plane wave front or non-plane wave light having a concave or convex curved wave front. For example, the backlight unit 10 may be formed so that the curved wave front of the non-plane wave light, which is emitted from the backlight unit 10, may have any shape selected from a paraboloid, a hyperboloid, an ellipsoid, a parabola, a hyperbola, and an elliptic line.

The spatial light modulator 30 is a device that spatially modulates light. The spatial light modulator 30 may control the intensity, color, and/or phase of incident light, and may be formed of a matrix including a plurality of controllable pixels. The spatial light modulator 30 reconstructs object points by changing the amplitude and/or phase of light passing through the pixels according to a CHG data signal, which is input from the controller 50, and generates a hologram image based on reconstructed object points.

According to the current exemplary embodiment, the spatial light modulator 30 may be a transmissive-type spatial light modulator. Examples of a transmissive-type spatial modulator include a modulator in which liquid crystal cells or electrowetting cells are arrayed, and the like.

The spatial light modulator 30 may be formed to have a curved surface. For example, the spatial light modulator 30 may be formed to have a concave curved surface. For example, the curved surface of the spatial light modulator 30 may have any shape selected from a paraboloid, a hyperboloid, an ellipsoid, a parabola, a hyperbola, an elliptic line, and the like.

When the spatial light modulator 30 has a curved shape, the curved surface of the spatial light modulator 30 may have locally the same radius of curvature as a distance between the spatial light modulator and a coordinate plane just in front of an eye lens. For example, the spatial light modulator 30 may be configured to have a concave curved surface.

When at least one of a wave front of light emitted from the backlight unit 10 and the spatial light modulator 30 has a curved surface, the amount of calculation required in Fresnel transformation for holography reproduction may be reduced.

For example, when the spatial light modulator 30 has a concave curved surface locally having the same radius of curvature as a distance between the spatial light modulator and a coordinate plane just in front of an eye lens, or the backlight unit 10 that emits light has a concave curved surface wave front locally having the same radius of curvature as a distance between the wave front and a coordinate plane just in front of an eye lens, the amount of calculation required for generation of CGH data that is needed for hologram generation may be reduced.

Figure 2:
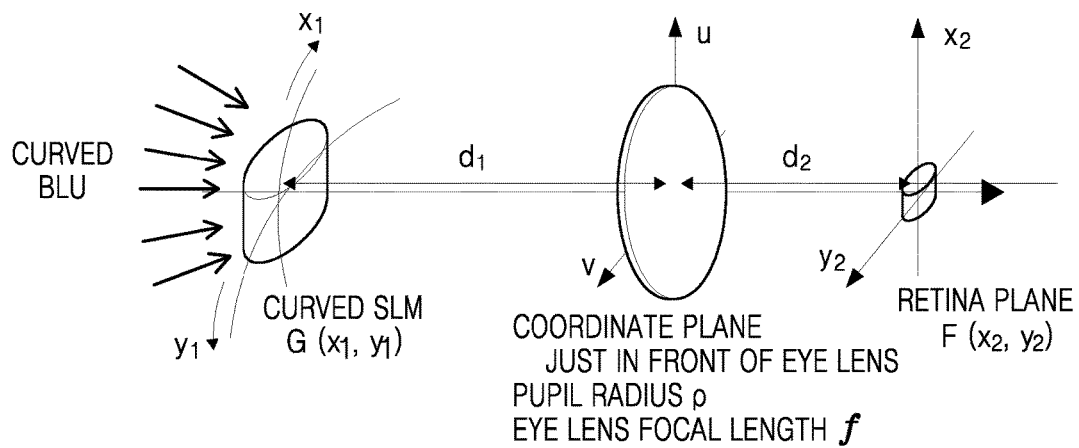
FIG. 2 is a diagram illustrating a process in which an image F is formed on a user's retina after a hologram image G is reproduced in a panel of the holography reproducing apparatus that uses a spatial light modulator having a concave curved surface.

FIG. 2 is a diagram illustrating a process in which an image F is formed on a user's retina after a hologram image G is reproduced in a panel of the holography reproducing apparatus having a spatial light modulator (SML) having a concave curved surface (i.e., a curved SLM) or a backlight unit (BLU) that emits light having a concave curved surface wave front (i.e., a curved BLU). Formula 1, which is reproduced below, is a formula that is used when calculating a shape of the image F, formed on a user's retina after the hologram image G is reproduced in the panel illustrated in FIG. 2. Formula 2, which is also reproduced below, is a formula that is used when calculating the hologram image G reproduced in the panel illustrated in FIG. 2, which is needed to generate the image F on the user's retina.

$$F(x_2, y_2) = \frac{1}{(j\lambda d_1)(j\lambda d_2)} e^{j\frac{\pi}{\lambda d_2}(x_2^2+y_2^2)} \qquad \text{[Formula 1]}$$
$$\int\int \left[ e^{j\frac{\pi}{\lambda}\left(\frac{1}{d_1}+\frac{1}{d_2}-\frac{1}{f}\right)(u^2+v^2)} \mathrm{circ}\left(\frac{u^2+v^2}{\rho^2}\right) \right.$$
$$\left. \int\int G(x_1, y_1) e^{-j\frac{2\pi}{\lambda d_1}(x_1 u + y_1 v)} dx_1 dy_1 \right]$$
$$e^{-j\frac{2\pi}{\lambda d_2}(ux_2+vy_2)} du dv$$

surface locally with a same radius of curvature as a distance between the wave front and a coordinate plane just in front of an eye lens.

Figure 3:
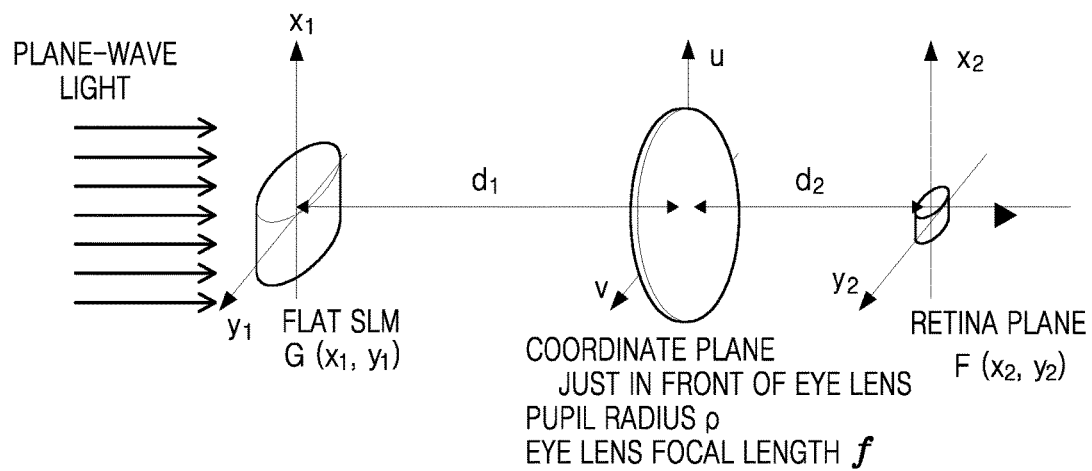
FIG. 3 is a diagram illustrating a process in which an image F is formed on a user's retina after a hologram image G is reproduced in a panel of a holography reproducing apparatus that uses a backlight unit emitting plane-wave light and a flat spatial light modulator.

FIG. 3 is a diagram illustrating a process in which an image F is formed on a user's retina after a hologram image G is reproduced in a panel of a holography reproducing apparatus that uses a backlight unit emitting plane-wave light and a flat spatial light modulator (i.e., a flat SLM). Formula 3, which is reproduced below, is a formula that is used when calculating a shape of the image F that is formed on the user's retina after the hologram image G is reproduced in the panel of the holography reproducing apparatus that uses the backlight unit emitting the plane-wave light and the flat SLM, as illustrated in FIG. 3. Formula 4, which is also reproduced below, is a formula that is used when calculating the hologram image G reproduced in the panel of the holography reproducing apparatus having the backlight unit that emits the plane-wave light and the flat SLM, as illustrated in FIG. 3, where the hologram image G is needed to generate the image F on the user's retina.

[Formula 3]
$$F(x_2, y_2) = \frac{1}{(j\lambda d_1)(j\lambda d_2)} e^{j\frac{\pi}{\lambda d_2}(x_2^2+y_2^2)} \int\int \left[ e^{j\frac{\pi}{\lambda}\left(\frac{1}{d_1}+\frac{1}{d_2}-\frac{1}{f}\right)(u^2+v^2)} \mathrm{circ}\left(\frac{u^2+v^2}{\rho^2}\right) \int\int \underbrace{e^{j\frac{\pi}{\lambda d_2}(x_1^2+y_1^2)}}_{A} G(x_1, y_1) e^{-j\frac{2\pi}{\lambda d_1}(x_1 u + y_1 v)} dx_1 dy_1 \right] e^{-j\frac{2\pi}{\lambda d_2}(ux_2+vy_2)} du dv$$

[Formula 4]
$$G(x_1, y_1) = \frac{(j)(j)}{(\lambda d_1)(\lambda d_2)} \underbrace{e^{j\frac{\pi}{\lambda d_2}(x_1^2+y_1^2)}}_{B} \int\int \left[ e^{-j\frac{\pi}{\lambda}\left(\frac{1}{d_1}+\frac{1}{d_2}-\frac{1}{f}\right)(u^2+v^2)} e^{j\frac{2\pi}{\lambda d_1}(ux_1+vy_1)} \int\int e^{-j\frac{\pi}{\lambda d_2}(x_2^2+y_2^2)} F(x_2, y_2) e^{j\frac{2\pi}{\lambda d_2}(x_2 u+y_2 v)} dx_2 dy_2 \right] du dv$$

-continued $$G(x_1, y_1) = \qquad \text{[Formula 2]}$$
$$\frac{(j)(j)}{(\lambda d_1)(\lambda d_2)} \int\int \left[ e^{-j\frac{\pi}{\lambda}\left(\frac{1}{d_1}+\frac{1}{d_2}-\frac{1}{f}\right)(u^2+v^2)} e^{j\frac{2\pi}{\lambda d_1}(ux_1+vy_1)} \right.$$
$$\left. \int\int e^{-j\frac{\pi}{\lambda d_2}(x_2^2+y_2^2)} F(x_2, y_2) e^{j\frac{2\pi}{\lambda d_2}(x_2 u+y_2 v)} dx_2 dy_2 \right] du dv$$

In Formulas 1 and 2, $(x_1, y_1)$ denotes coordinates in the surface of a spatial light modulator, $(x_2, y_2)$ denotes coordinates in a retina plane, and $(u, v)$ denotes coordinates of a coordinate plane just in front of an eye lens. Further, 'j' denotes an imaginary unit satisfying a condition $j^2 = -1$, '$\lambda$' denotes the wavelength of light, '$d_1$' denotes a distance between the spatial light modulator (the curved SLM) and the coordinate plane just in front of the eye lens, and '$d_2$' denotes a distance between the coordinate plane just in front of the eye lens and the retina plane. Still further, '$\rho$' denotes a pupil radius, and 'f' denotes a focal distance of the eye lens. Finally, the 'circ' function is a function satisfying a condition circ(r)=1 (r<1) & 0.5 (r=1) & 0 (r>1).

Formulas 1 and 2 are used when a curved wave front of light emitted from the backlight unit 10 has the shape of a concave paraboloid locally with a same radius of curvature as a distance between the spatial light modulator and a coordinate plane just in front of an eye lens, or the spatial light modulator 30 has the shape of a concave paraboloidal When comparing Formula 3 with Formula 1, 'A' in Formula 3 may be removed when a curved wave front of light emitted from the backlight unit 10 has the shape of a paraboloid locally with a same radius of curvature as a distance between the wave front and a coordinate plane just in front of an eye lens, or the spatial light modulator 30 has the shape of a paraboloidal surface locally with a same radius of curvature as a distance between the spatial light modulator and a coordinate plane just in front of an eye lens. Thus, the amount of calculation that is needed when calculating a shape of the image F that is formed on the user's retina after the hologram image G is reproduced in the panel, is greatly reduced.

Similarly, when comparing Formula 4 with the formula 2, 'B' in Formula 4 may be removed when a curved wave front of light emitted from the backlight unit 10 has the shape of a paraboloid locally with a same radius of curvature as a distance between the wave front and a coordinate plane just in front of an eye lens, or the spatial light modulator 30 has the shape of a paraboloidal surface locally with a same radius of curvature as a distance between the spatial light modulator and a coordinate plane just in front of an eye lens. Thus, the amount of calculation is greatly reduced when calculating the hologram image G of the panel which is needed to generate the image F on the user's retina.

Formulas 1 and 2 show, as an example, a case in which a curved wave front of light emitted from the backlight unit 10 has the shape of a paraboloid locally with a same radius of curvature as a distance between the wave front and a coordinate plane just in front of an eye lens, or the spatial light modulator 30 has the shape of a paraboloidal surface locally with a same radius of curvature as a distance between the spatial light modulator and a coordinate plane just in front of an eye lens. When a curved wave front of light emitted from the backlight unit 10 has the shape of a parabola locally with a same radius of curvature as a distance between the wave front and a coordinate plane just in front of an eye lens, or the spatial light modulator 30 has the shape of a parabola (i.e., a parabolic spatial light modulator) locally with a same radius of curvature as a distance between the spatial light modulator and a coordinate plane just in front of an eye lens, Formula 1 for calculating the image F and Formula 2 for calculating the hologram image G have forms in which any one of $x_1^2$ and $y_1^2$ is removed from 'A' of Formula 3 and 'B' of Formula 4, respectively. Formula 5, which is reproduced below, exemplarily shows a formula for calculating the image F, which has a form in which $y_1^2$ is removed from 'A' of Formula 3, from a backlight unit and a spatial light modulator each have a flat shape. Thus, according to an exemplary embodiment, the amount of calculation that is required for generating a hologram may be reduced.

Since it is possible to approximate areas of interest of most curved surfaces or curves to a paraboloid or a parabola, the calculation of the image F and the calculation of the hologram image G may be obtained by using Formula 1 and Formula 2, respectively, although the curved wave front of light emitted from the backlight unit 10, or the spatial light modulator 30 each have any shape selected from a hyperboloid, an ellipsoid, a hyperbola, and an elliptic line, which has locally a same radius of curvature as a distance between the wave front/the spatial light modulator and a coordinate plane just in front of an eye lens.

Formula 7, which is reproduced below, shows that an ellipsoid and a hyperboloid may be approximated to a function of $x^2+y^2$ indicating a paraboloid.

[Formula 7]

$$\boxed{\text{paraboloid}} \quad z = ax^2 + ay^2 \quad z = a(x^2 + y^2)$$

$$\boxed{\text{ellipsoid}} \quad \frac{x^2}{a^2} + \frac{y^2}{a^2} + \frac{z^2}{b^2} = 1 \quad \Rightarrow \quad z = \sqrt{b^2 - \frac{b^2}{a^2}(x^2+y^2)} \cong b\left[1 - \frac{1^2}{2a^2}(x^2+y^2)\right] + O\left(\frac{x^3}{a^3}, \frac{y^3}{a^3}\right)$$

$$\boxed{\text{hyperboloid}} \quad -\frac{x^2}{a^2} - \frac{y^2}{a^2} + \frac{z^2}{b^2} = 1 \quad z = \sqrt{b^2 + \frac{b^2}{a^2}(x^2+y^2)} \cong b\left[1 + \frac{1^2}{2a^2}(x^2+y^2)\right] + O\left(\frac{x^3}{a^3}, \frac{y^3}{a^3}\right)$$

$$(a \gg x, y,),$$

Here, the "O" means the nominal value in the equation.

and Formula 6, which is also reproduced below, exemplarily shows a formula for calculating the hologram image G, which has a form in which $y_1^2$ is removed from 'B' of Formula 4. However, the exemplary embodiments are not limited thereto, and $x_1^2$ may be removed instead of $y_1^2$.

$$F(x_2, y_2) = \frac{1}{(j\lambda d_1)(j\lambda d_2)} e^{j\frac{\pi}{\lambda d_2}(x_2^2 + y_2^2)} \quad \text{[Formula 5]}$$

$$\int\int\left[e^{j\frac{\pi}{\lambda}\left(\frac{1}{d_1}+\frac{1}{d_2}-\frac{1}{f}\right)(u^2+v^2)} circ\left(\frac{u^2+v^2}{\rho^2}\right)\right.$$

$$\left.\int\int e^{j\frac{\pi}{\lambda d_1}x_1^2} G(x_1, y_1) e^{-j\frac{2\pi}{\lambda d_1}(x_1 u + y_1 v)} dx_1 dy_1\right]$$

$$e^{-j\frac{2\pi}{\lambda d_2}(ux_2 + vy_2)} dudv$$

$$G(x_1, y_1) = \quad \text{[Formula 6]}$$

$$\frac{(j)(j)}{(\lambda d_1)(\lambda d_2)} e^{-j\frac{\pi}{\lambda d_1}x_1^2} \int\int\left[e^{-j\frac{\pi}{\lambda}\left(\frac{1}{d_1}+\frac{1}{d_2}-\frac{1}{f}\right)(u^2+v^2)} e^{j\frac{2\pi}{\lambda d_1}(ux_1+vy_1)}\right.$$

$$\left.\int\int e^{-j\frac{\pi}{\lambda d_2}(x_2^2+y_2^2)} F(x_2, y_2) e^{j\frac{2\pi}{\lambda d_2}(x_2 u + y_2 v)} dx_2 dy_2\right]$$

$$dudv$$

As illustrated by a comparison between Formulas 1, 5, and 3 and a comparison between Formulas 2, 6, and 4, when a curved wave front of light emitted from the backlight unit 10, or the spatial light modulator 30 has the shape of a paraboloid or a parabola, calculation formulas are simplified as compared to a case when a wave front of light emitted As shown in Formula 7, an ellipsoid and a hyperboloid may be approximated to a paraboloid with respect to an 'x, y' area that is much smaller than the value of 'a'. In addition, a formula obtained by removing only $x^2$ or $y^2$ from Formula 7 may be applied also to a case of an elliptic line and a hyperbola other than an ellipsoid and a hyperboloid.

Accordingly, when the curved wave front of light emitted from the backlight unit 10, or the spatial light modulator 30 each have a shape selected from a paraboloid, a parabola, a hyperboloid, an ellipsoid, a hyperbola, and an elliptic line, it is possible to calculate, by using Formula 1, an image F to be formed on a user's retina after a hologram image G is reproduced in a panel of the holography reproducing apparatus according to an exemplary embodiment, which includes the backlight unit 10 and the spatial light modulator 30. In addition, it is possible to calculate, by using Formula 2, the hologram image G of the panel of the holography reproducing apparatus according to an exemplary embodiment, which is needed to generate the image F on the user's retina.

In the holography reproducing apparatus according to an exemplary embodiment, CGH data for reproducing a desired hologram image may be generated when at least one of a wave front of light emitted from the backlight unit 10 and the spatial light modulator 30 that modulates light input from the backlight unit 10 and transmits the modulated light to generate a transmissive hologram image has a curved surface. The transmissive hologram image may be reproduced by modulating light incident on the spatial light modulator 30 based on the generated CGH data.

In addition, by forming the holography reproducing apparatus by using the spatial light modulator 30 having a concave curved surface, or the backlight unit 10 that emits light having a concave curved wave front, the hologram image may be provided to a user without using a field lens, and the amount of calculation required in a Fresnel transformation may be reduced. That is, since the number of terms required for calculation is reduced, the amount of calculation may be reduced during hologram generation, and thus, the hardware required for real time hologram reproduction may be reduced. In addition, a sense of immersion of a viewer may be improved due to the concave curved surface of the spatial light modulator 30. When the spatial light modulator 30 is a flat spatial light modulator, a viewing angle at which a user may view a hologram is limited to the size of the flat spatial light modulator. However, when a hologram is generated by using the spatial light modulator 30 having a concave curved surface and/or the backlight unit 10 that emits light having a concave curved wave front, a viewing angle of a user may expand up to 180 degrees.

If a spatial light modulator and a backlight unit each have a flat shape, the amount of calculation increases, as in, e.g., Formulas 3 and 4, and thus, the amount hardware is required for calculation also increases. Further, a sense of immersion of a user may be lowered since a viewing angle of a user is narrow.

Figure 4:
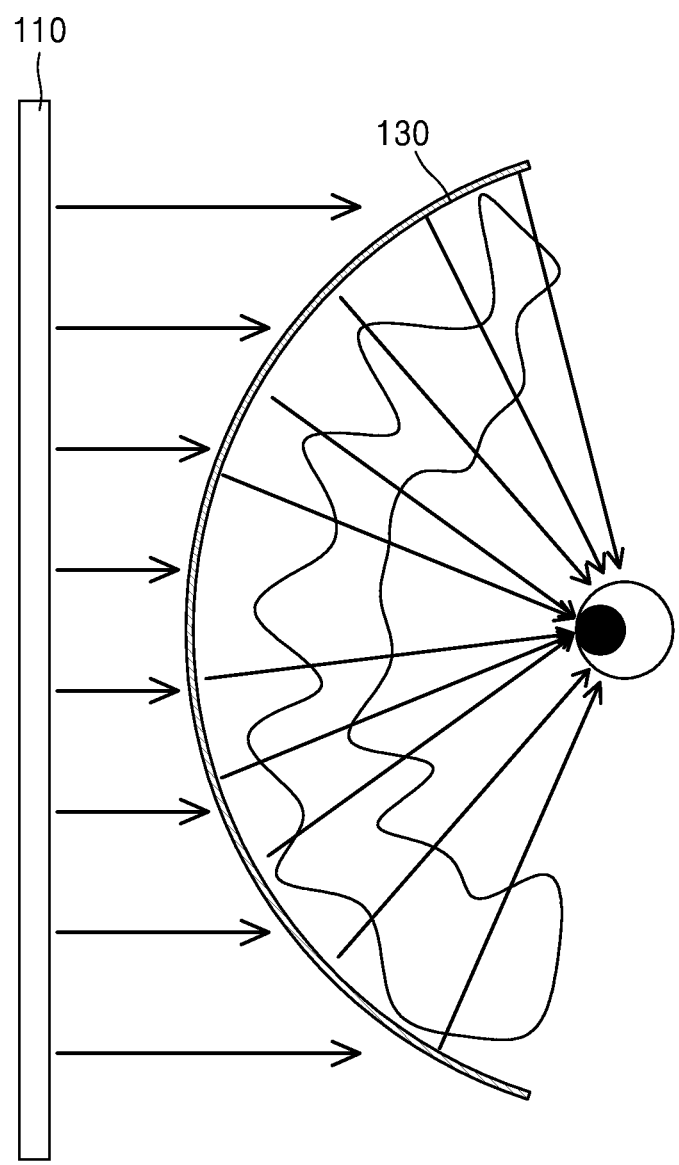
FIGS. 4 through 6 are schematic diagrams illustrating holography reproducing apparatuses according to various exemplary embodiments.

Although a case in which a wave front of light emitted from the backlight unit 10 has a concave curved surface, or the spatial light modulator 30 has a concave curved surface is described in the exemplary embodiment illustrated in FIGS. 1 and 2, the exemplary embodiments are not limited thereto. For example, according to an exemplary embodiment, when a pixel size of a spatial light modulator is sufficiently small, as shown in FIG. 4, a backlight unit 110 may be formed to emit a plane wave and only a spatial light modulator 130 may be formed to have a curved surface. Also, in this case, a holography reproducing apparatus may be implemented without using a field lens.

Figure 5:
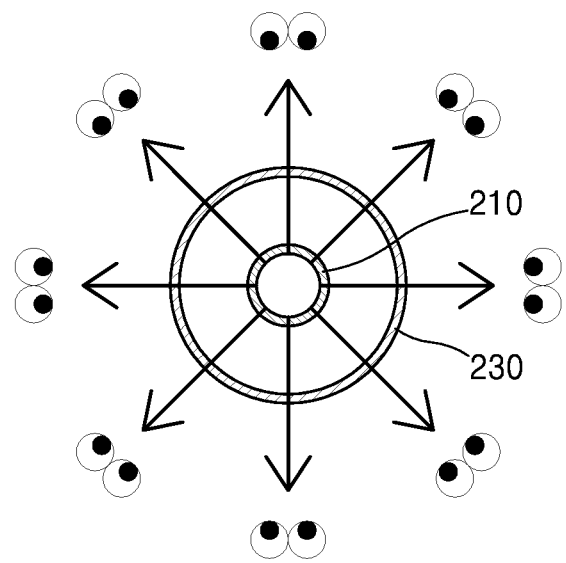

As shown in FIG. 5, the holography reproducing apparatus according to an exemplary embodiment may include a backlight unit 210 emitting light having a convex wave front and a spatial light modulator 230 having the shape of a convex cylinder, sphere (hemisphere), or ellipsoid (half ellipsoid). The backlight unit 210 may be positioned at the center of the spatial light modulator 230, and the spatial light modulator 230 modulates light emitted from the backlight unit 210, based on CGH data, and transmits the modulated light to generate a hologram image. In this case, users located at any angle (i.e., 360 degrees) may view the hologram image.

Figure 6:
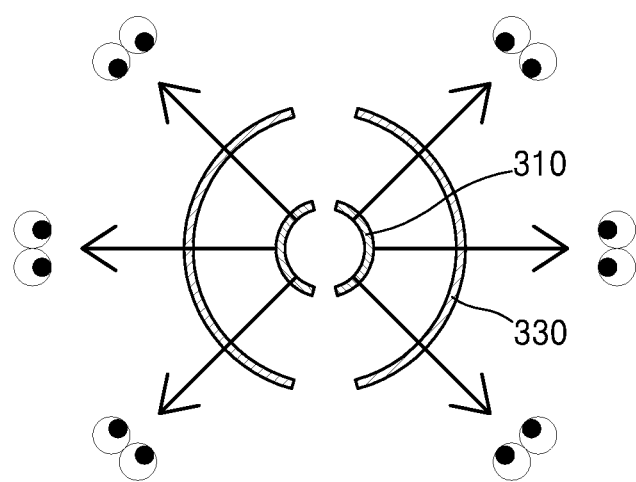

In addition, as shown in FIG. 6, the holography reproducing apparatus according to an exemplary embodiment may include a plurality of spatial light modulators 330 each having a convex shape and a plurality of backlight units 310 each having a convex shape. In this case, each of the plurality of spatial light modulators 330 modulates light emitted from a corresponding backlight unit 210, based on CGH data, and transmits the modulated light to generate a hologram image. Accordingly, users located at relatively large angles may view a hologram image.

When the backlight unit 210 or 310 is centrally positioned as shown in FIGS. 5 and 6 and the spatial light modulator 230 or 330 modulates light emitted from the backlight unit 210 or 310 and generates a hologram image in various directions, a range of a viewing angle may expand with respect to the center of a panel.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A holography reproducing apparatus comprising: a backlight configured to emit coherent light having a curved wave front, the backlight having a concave curved surface corresponding to the curved wave front; and a spatial light modulator having a curved surface, wherein the spatial light modulator is configured to modulate light input from the backlight and transmit the modulated light to generate a transmissive hologram image.

2. The holography reproducing apparatus of claim 1, wherein the curved surface of the spatial light modulator has locally the same radius of curvature as a distance between the spatial light modulator and a coordinate plane just in front of a lens of a viewer's eye.

3. The holography reproducing apparatus of claim 2, wherein the curved surface of the spatial light modulator is a concave curved surface.

4. The holography reproducing apparatus of claim 3, wherein the spatial light modulator has a curved surface having a shape selected from a paraboloid, a hyperboloid, an ellipsoid, a parabola, a hyperbola, and an elliptic curve.

5. The holography reproducing apparatus of claim 1, wherein the curved surface of the spatial light modulator has a shape selected from a paraboloid, a hyperboloid, an ellipsoid, a parabola, a hyperbola, and an elliptic curve.

6. The holography reproducing apparatus of claim 1, wherein the backlight is further configured to emit non-plane wave light having a curved wave front locally with the same radius of curvature as a distance between the curved wave front and a coordinate plane just in front of a lens of a viewer's eye.

7. The holography reproducing apparatus of claim 6, wherein the backlight is further configured to emit non-plane wave light having a wave front that has a shape selected from a paraboloid, a hyperboloid, an ellipsoid, a parabola, a hyperbola, and an elliptic curve.

8. The holography reproducing apparatus of claim 6, wherein the backlight is further configured to emit non-plane wave light having a concave curved wave front.

9. The holography reproducing apparatus of claim 1, wherein the curved wave front of the coherent light emitted from the backlight and the curved surface of the spatial light modulator each have a shape selected from a paraboloid, a hyperboloid, an ellipsoid, a parabola, a hyperbola, and an elliptic curve.

10. The holography reproducing apparatus of claim 9, wherein the curved wave front of the coherent light emitted from the backlight and the curved surface of the spatial light modulator are concave curved surfaces.

11. The holography display apparatus of claim 1, wherein the backlight has locally the same radius of curvature as a distance between the curved wave front and a coordinate plane just in front of a lens of a viewer's eye.

12. A holography reproducing method comprising: generating computer generated hologram (CGH) data for reproducing a hologram image when coherent light emitted from a backlight has a curved wave front and a spatial light modulator that modulates light input from the backlight and transmits the modulated light to generate a transmissive hologram image has a curved surface, the backlight having a concave curved surface corresponding to the curved wave front; and reproducing the transmissive hologram image by modulating light incident on the spatial light modulator, based on the generated CGH data.

13. The holography reproducing method of claim 12, wherein the generating of the CGH data comprises generating a signal for controlling the spatial light modulator to reproduce a hologram image when the spatial light modulator has a curved surface.

14. The holography reproducing method of claim 13, wherein the generating of the CGH data comprises generating a signal for controlling the spatial light modulator to reproduce a hologram image when the curved surface of the spatial light modulator has locally the same radius of curvature as a distance between the spatial light modulator and a coordinate plane just in front of a lens of a viewer's eye.

15. The holography reproducing method of claim 14, wherein the generating of the CGH data comprises generating a signal for controlling the spatial light modulator to reproduce a hologram image when the curved surface of the spatial light modulator is a concave curved surface.

16. The holography reproducing method of claim 15, wherein the generating of the CGH data comprises generating a signal for controlling the spatial light modulator to reproduce a hologram image when the curved surface of the spatial light modulator has a shape selected from a paraboloid, a hyperboloid, an ellipsoid, a parabola, a hyperbola, and an elliptic curve.

17. A holographic display apparatus comprising: a backlight configured to emit coherent light having a curved wave front, the backlight having a concave curved surface corresponding to the curved wave front; a controller configured to generate data to reproduce a hologram image; and a curved spatial light modulator configured to modulate the coherent light and transmit the modulated light to render the hologram image, based on the generated data.

18. The holographic display apparatus of claim 17, wherein the curved spatial light modulator has locally the same radius of curvature as a distance between the spatial light modulator and a coordinate plane just in front of a lens of a viewer's eye.

* * * * *